UNITED STATES PATENT OFFICE.

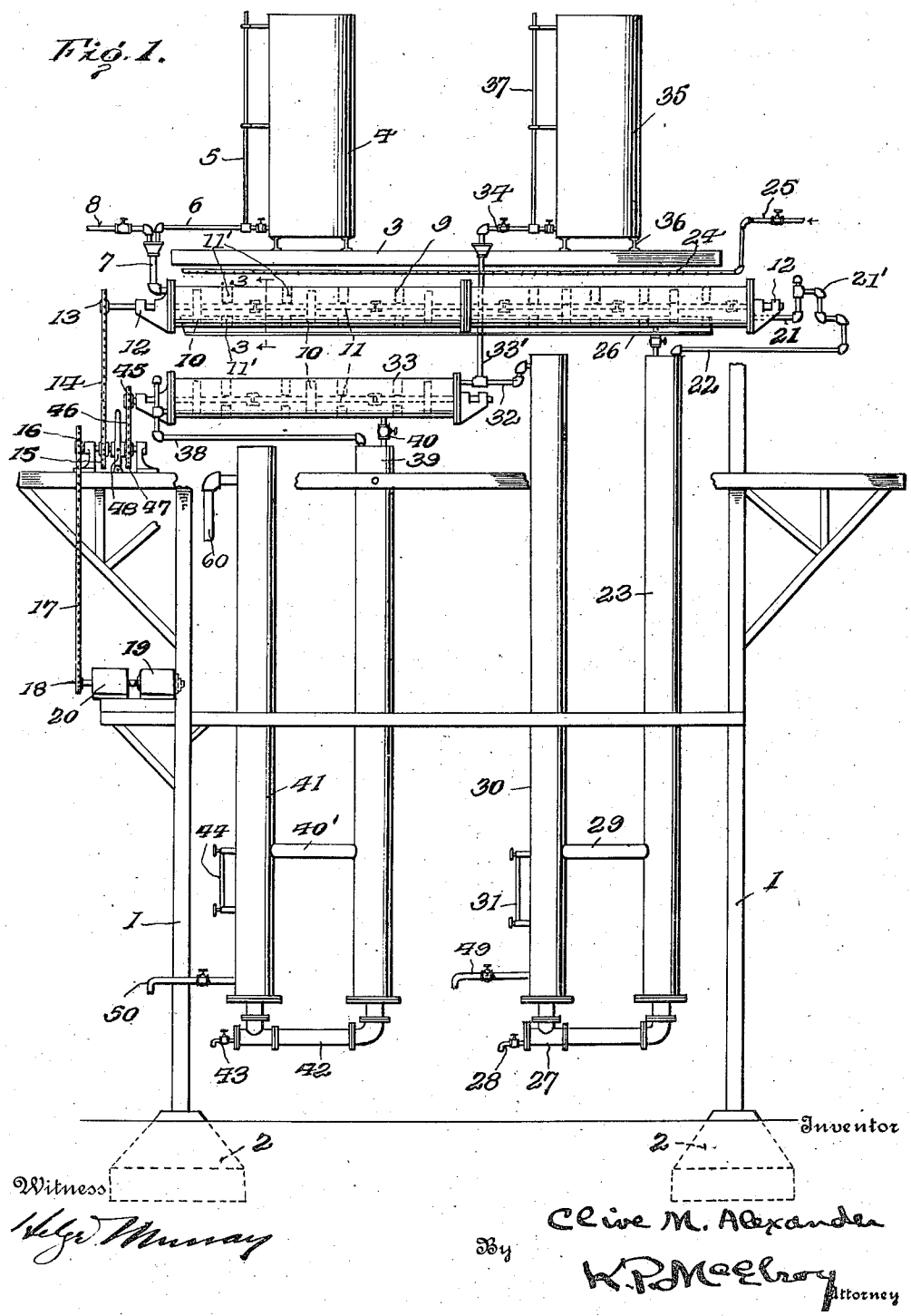

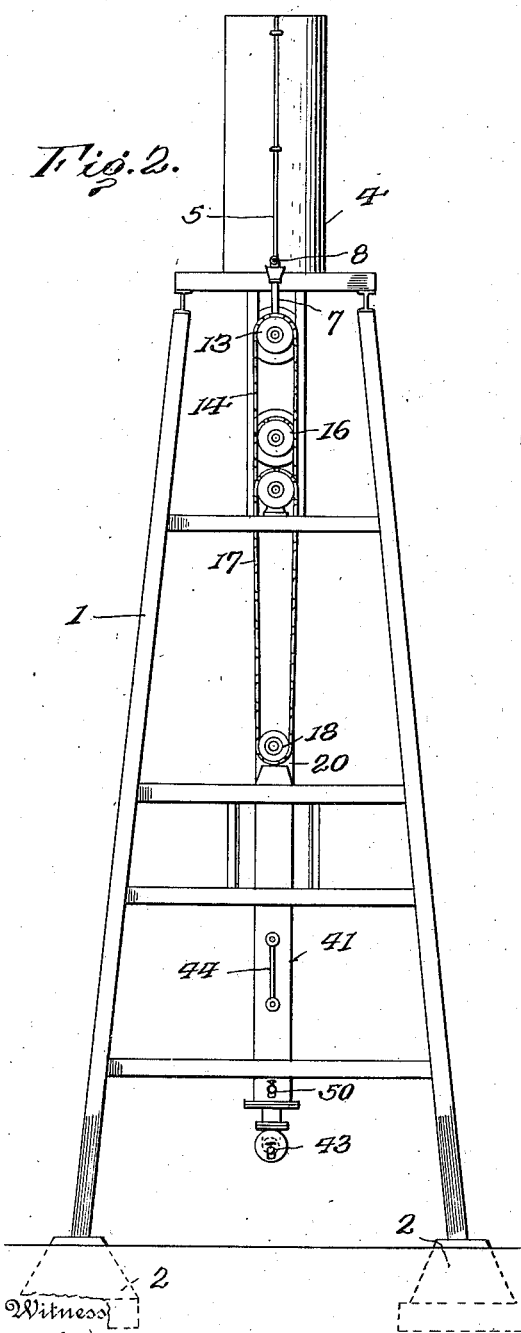
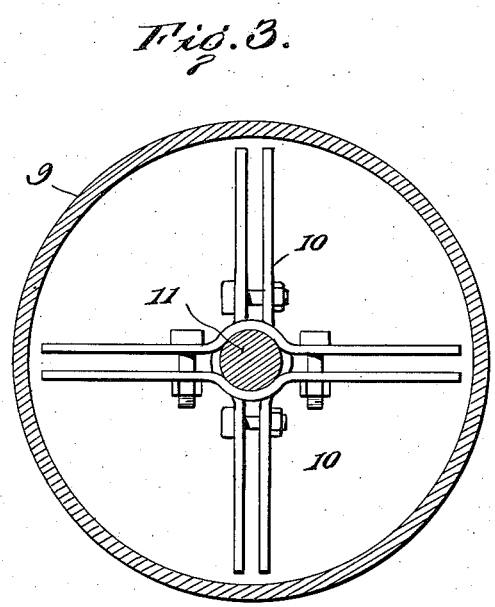

CLIVE M. ALEXANDER, OF PORT ARTHUR, TEXAS, ASSIGNOR TO GULF REFINING COMPANY, OF PITTSBURGH, PENNSYLVANIA, A CORPORATION OF TEXAS.

METHOD OF PURIFYING OILS.

1,402,733.   Specification of Letters Patent.   Patented Jan. 10, 1922.

Application filed October 1, 1917. Serial No. 194,199.

*To all whom it may concern:*

Be it known that I, CLIVE M. ALEXANDER, a citizen of the United States, residing at Port Arthur, in the county of Jefferson and State of Texas, have invented certain new and useful Improvements in Methods of Purifying Oils, of which the following is a specification.

This invention relates to methods of purifying oils and apparatus therefor; and it comprises a method of purifying mineral oils, particularly applicable to cracked gasoline, wherein the oil is mechanically agitated in a flowing current with a small proportion of sulfuric acid under temperature controlled conditions; in the case of the treatment of cracked gasoline this sulfuric acid treatment being followed by a neutralizing treatment in the same manner and a subsequent steam distillation; and it also comprises certain combinations of apparatus elements adapted for use in the described process; all as more fully hereinafter set forth and as claimed.

In the purification of mineral oil it is the general practice to use sulfuric acid at some stage in the operation. Ordinarily rather large amounts of sulfuric acid are employed and the oil and the acid are kept mingled and agitated by the use of an air blast. The function of the sulfuric acid in the purification of the oils is not wholly understood, but it appears in large part to reside, in the usual methods of operation, in a combination of the sulfuric acid with various unsaturated bodies and aromatic bodies present; these reactive bodies being removed by the acid. In part the result seems to be the formation of sulfonic acids and other sulfur compounds. After the treatment with sulfuric acid the acid is allowed to settle and the oil is washed with alkalis and water. The sludge acid is treated in various ways not necessary here to describe. The oil treated with the acid has its color and burning qualities improved and it is also freed of various detrimental impurities.

One of the common ways of making an artificial gasoline today is the subjection of high boiling oils of various kinds, such as gas oil, solar oil, crude oil, etc., to a high heat, the high heat being frequently accompanied by pressure. The oil may be treated in the liquid form or the vapor form as the case may be. The action of the heat is to break down the high boiling oil into lower boiling fractions; these fractions having to a greater or less extent the right boiling point for commercial gasoline. This process is known as "cracking" and the product is cracked gasoline. For the most part, these processes give gasolines of highly unsaturated nature; a fact which does not militate against their use in internal combustion engines but does affect their commercial quality and price considerably. These cracked, unsaturated gasolines are frequently quite yellow and the color tends to increase on standing. It is not practicable to "treat" these gasolines with sulfuric acid in the usual way for a number of reasons. One, and the most important, is that since much of the oil is unsaturated, the action of the sulfuric acid in the usual way would cause too much of a loss of material; the shrinkage of the oil after an exhaustive treatment with sulfuric acid is too great; and too much sulfuric acid is also required. For another thing, treatment with sulfuric acid and agitation by means of an air blast causes too much of a loss of vapor with these highly volatile gasolines. Also, since the difference in specific gravity of sulfuric acid and light gasoline is very great there are mechanical difficulties in securing a thorough and complete intermingling of the acid and oil where the two are treated as large bodies by air blowing.

I have discovered that I can treat these gasolines with sulfuric acid without the noted great loss of oil or the use of great quantities of acid, producing an important improvement in their character; and notably in the removal of the yellow color. In so doing in the case of cracked gasoline I employ a process consisting of several successive steps, one of these steps being a special treatment with sulfuric acid. This particular treatment with sulfuric acid however is applicable to other oils than gasoline and in the description and claims hereinafter following I wish it to be understood that as regards this step of my invention I do not restrict it to the treatment of cracked gasoline, although I regard such a treatment of cracked gasoline as being the most advantageous embodiment of my invention. I shall hereinafter therefore more specifically describe its application to cracked gasoline in connection with my complete process.

In this complete process with cracked gasoline, I feed the gasoline and the sulfuric acid in proportioned small streams simultaneously into a tubular mixing device provided with a revolving paddle, screw or the like and convey the two therethrough under constant agitation. The conduit I may provide with means for controlling its temperature; of abstracting the heat of reaction. Under these circumstances and with a small proportion of sulfuric acid of 90 per cent or higher strength, say about 5 pounds or less to the barrel, the action appears to be more of an oxidation of certain constituents than a direct union with, or polymerization of, the unsaturated bodies present. I have found that I can replace the sulfuric acid in this treatment with various other oxidizing agents or I can lessen the weight of sulfuric acid required by dissolving in it oxidizing materials such as potassium or sodium bichromate. As little as one per cent of acid is effective for the present purposes but I advantageously use somewhat more. The oil and the acid are caused to travel through the stated mixing conduit for a time and are then deposited in a settling column to separate. The gasoline is then passed in a similar way through a conduit together with a little caustic soda. A quarter gallon of 30° Baumé solution of caustic soda per barrel is an advantageous quantity. After the treatment with the caustic soda, the gasoline is allowed to settle as before and is then sent to a still where it is distilled with the aid of steam. If desired, the alkali may be placed in the steam still and the intermediate passage of oil and alkali through a mixing conduit omitted; but I find it more advantageous to proceed as described. If alkalization is done in the steam still, milk of lime may be used in lieu of caustic soda.

As stated, the action of sulfuric acid in the present invention appears to be more of an oxidation than any action upon the unsaturated bodies. The color is removed and the oil is otherwise improved but the unsaturated bodies are not removed. There is no great loss of oil; and the whole process may be conducted with 95 per cent recovery of clean good gasoline and, as stated, as little as one per cent of 98 per cent acid has been found efficient in the present process; an amount which can be again reduced to half by using a little bichromate or other oxidizing salt in connection with the acid. The amount of acid used being very small the amount of acid sludge formed is also of course little; and as a matter of fact most of the products formed by the acid in this operation appear to be oil soluble so that there is very little sludge in any event.

In treating oils with small amounts of acid in the present invention the size of the conduit through which they travel should be ample enough to give considerable free space above the normal liquid level in order to insure thorough agitation and mutual contact of the two liquids. While I have described the process as used with cracked gasoline, it is of course equally applicable to cracked kerosene or to other oils, such as lubricating oils, where it is desired to produce merely a decolorizing and purifying action without the substantial loss of oil occurring in the usual treatment with sulfuric acid.

In the accompanying drawings I have shown more or less diagrammatically one form of apparatus capable of performing the process and within the purview of my invention. In these drawings—

Figure 1 is a front elevation of the apparatus, various structural elements, such as beams, brace rods and stay wires and workmen's platforms being omitted for simplicity of illustration;

Figure 2 is an end elevation taken to the left of Figure 1;

Figure 3 is a vertical section along line 3—3 of Figure 1 taken in the direction of the arrows.

Referring to the drawings 1 indicates beams of suitable character embedded in the foundation of concrete 2 and supporting the several elements of the complete apparatus as hereinafter described. Mounted upon the cross beam 3 is a tank 4 in which the sulfuric acid is stored, and from which it is distributed. This tank is provided with a gage 5. Leading from the bottom of the tank is a pipe 6 which serves to conduct the sulfuric acid into the pipe 7 where it is joined by the gasoline delivered from a pump (not shown) through pipe 8. The gasoline and oil are admitted into horizontal mixing casing 9 containing mixing blades 10 mounted on shaft 11 (see Fig. 3). Stationary blades or lugs 11' may be mounted on the casing to cooperate with the rotary blades of the shaft. The shaft is journaled at 12 and driven by gear 13 actuated by chain 14 from pinion 15. This pinion is mounted on a shaft driven by gear 16, chain 17 and pinion 18, actuation being by motor 19. Suitable reduction gear between the motor and the latter pinion is indicated by 20.

The oil and the sulfuric acid are mixed and conveyed through the mixing casing 9 and find exit through the pipe 21, provided with swingable level adjusting device 21'. In order to secure the best results the casing is kept about half full of liquid to give an ample splash space, the level being controlled by this device. The mixture goes by pipe 22 to the tall vertical separator 23. The action of the oil and sulfuric acid on each other will of course develop heat and therefore it may be advantageous to control the temperature in the mixing casing by means of a spray device 24 supplied with cold water through pipe 25. The sprayed water is collected in the trough 26. The acid settles to the bottom of the separator 23, whence it may be drawn off, either continuously or intermittently, through pipe 27 and cock 28. The gasoline by-passes through connection 29 at a higher level and ascends through another leg, 30, of the separator, gage 31 being provided on this second leg for observation purposes. Any acid settling in this second leg joins that from the first leg. From the leg 30 the gasoline is conducted through pipe 32 to a second conveyer and agitator 33, advantageously made of less length than the first mixing casing (9) but of similar construction. To this pipe is connected a pipe 33' leading upwardly and receiving alkali solution or lye from pipe 34 leading from tank 35. The lye tank may be of similar construction to the sulfuric acid tank (4) and, like it, is mounted on the platform 3 upon I-beams 36. It is provided with a gage 37. The mixing casing 33 receives and delivers a mixture of lye and gasoline, together with any separated matters, through pipe 38 to a separator 39. Another valved pipe, 40, is provided to permit tapping sediment collecting in the bottom of the mixing casing directly to this separator. The structure of the lye separator is similar to that of the separator 23. It is provided with a by-pass 40' at a point well above its bottom through which clarified and settled gasoline may flow to the leg 41. Alkali solution and any impurities settle to the bottom of the separator and may be drawn off either continuously or from time to time, through pipe 42 and cock 43. A gage 44 is provided to enable observation of the treated gasoline.

The mixing casing for the lye wash is provided with agitating means similar to those of the mixing casing for the acid treatment. Motion is imparted by pulley 45 on shaft 11 and chain 46, driven by pinion 47. Under certain conditions, as hereinbefore explained, a special lye treatment may be dispensed with, in which event the stirrer of the lye treater may be thrown out of action through the clutch mechanism shown, more or less diagrammatically, at 48. Both the sulfuric acid and lye separators may be provided with additional draw-offs 49 and 50, respectively, for testing purposes.

The operation of the structure is obvious from the foregoing description and the drawing. It will be noted that the process is a continuous one in the sense that there is a constant feed of gasoline to be purified to the apparatus and withdrawal of purified gasoline to the stills. This purified gasoline leaves the purifying apparatus through pipe 60 whence it may be taken to a steam still (not shown).

In a specific embodiment of the present invention, using the apparatus described, I pass cracked gasoline into the mixing casing 9. With it I introduce sulfuric acid of 90 to 98 per cent (stronger or weaker acids are not as desirable) through inlet 6 at the rate of about 3 to 5 pounds of acid per barrel of cracked gasoline. The acid and oil pass through 9 into 23 and 30 where the acid settles to the bottom. The gasoline passes through 32 into the similar mixing casing 33 where it is joined by caustic soda solution from 34. With the amount of acid stated, I usually employ about one quart of 30° caustic soda solution per barrel. The caustic soda solution and the gasoline are agitated together in 33 and pass into 39 and 41 where the caustic soda solution settles to the bottom, the gasoline passing to exit at 60. It may be taken by 60 to a steam still (not shown) and distilled with the aid of steam. Or, as stated, the acid treated mixture may be taken directly from 30 to a steam still (not shown) and there distilled in the presence of a little lime.

The proportions and strengths of acid and alkali stated give good results, but both are susceptible of variation. For example, by using a somewhat stronger soda lye, say, one of 45° Baume and putting a little soda or lime in the still, a weaker acid, say one of 85 per cent, may be employed in the acid treatment.

But little acid sludge is formed in the present invention, most of the excess of acid going into the wash water; and there is a correspondingly small loss of oil. In treating a cracked oil, the amount of gasoline recovered will of course depend upon the amount present; but in all cases the loss of oil in the action is very little. In cracking oils, the nature of the product depends on the manufacturing methods; and the product delivered by the condensers may all, or substantially all, be of such a nature as regards boiling points that it will rank commercially as a motor fuel or gasoline; or it may be, say, 50 per cent gasoline and 50 per cent burning oils. In applying the present method to such a cracking oil condensate, naturally only half the product recovered in the steam still will be gasoline.

But with ordinary cracked gasoline about 95 per cent of material of about the same gravity can be recovered as a distillate from the steam stills; the remaining 5 per cent being made up of, say, one per cent loss and, say, 4 per cent heavy residues not distilled over in the steam still in making the gasoline cut. Use of weaker acids than about 98 per cent in the treatment results in a greater loss of gasoline.

The color of the gasoline recovered in the present method depends to some extent on the strength of acid used. For a high degree of decolorization, stronger acid is necessary than for lower degrees.

What I claim is:

1. In the purification of oils, the process which comprises transmitting an oil to be purified together with a small proportion of sulfuric acid as a continuously flowing stream through a temperature controlled conduit under mechanical agitation, the amount of acid being merely sufficient to oxidize unsaturated bodies with improvement of color without any substantial removal of hydrocarbons or polymerization thereof.

2. In the decolorization of cracked gasoline, the process which comprises conveying such a cracked gasoline together with a small amount of sulfuric acid as a continuously flowing stream through a temperature controlled conduit under mechanical agitation.

3. In the purification and decolorization of cracked gasoline, the process which comprises conveying such cracked gasoline together with a small amount of sulfuric acid as a continuously flowing stream through a temperature controlled conduit under mechanical agitation, contacting the gasoline with alkali and steam distilling.

4. In the purification and decolorization of cracked gasoline, the process which comprises conveying such cracked gasoline together with a small amount of sulfuric acid as a continuously flowing stream through a temperature controlled conduit under mechanical agitation, contacting said gasoline with caustic soda solution in sufficient amount to remove remaining acid and then steam distilling the neutralized gasoline.

5. In the purification and decolorization of cracked gasoline, the process which comprises conveying such gasoline together with a little sulfuric acid as a continuously flowing stream through a temperature controlled conduit under mechanical agitation, thereafter passing the gasoline through a temperature controlled conduit in a similar manner in contact with a caustic soda solution and steam distilling the gasoline so treated.

6. In the purification of petroleum oils containing unsaturated bodies, the process which comprises contacting with such petroleum oils, as a flowing stream through a temperature controlled conduit and under mechanical agitation not substantially more than 5 pounds sulfuric acid to the barrel of oil, to improve the color without any substantial loss of the hydrocarbons or polymerization thereof.

7. In the purification of oils, the process which comprises transmitting an oil to be purified together with a small proportion of sulfuric acid and another oxidizing agent as a continuously flowing stream through a temperature controlled conduit under mechanical agitation.

8. In the purification of oils, the process which comprises transmitting an oil to be purified together with a small quantity of sulfuric acid as a continuously flowing stream through a horizontal conduit partially filled with the mixture and there submitting it to vigorous agitation.

9. The process of treating cracked gasoline which comprises feeding the cracked gasoline together with a small proportion of sulfuric acid into and through a horizontal tubular closed conduit and there vigorously agitating the gasoline and acid together, such conduit being maintained only partially filled with the mixture of gasoline and acid flowing therethrough.

In testimony whereof, I affix my signature.

CLIVE M. ALEXANDER.